United States Patent [19]

Sands et al.

[11] 3,773,282

[45] Nov. 20, 1973

[54] VEHICLE CONTROL SYSTEM

[75] Inventors: Ronald L. Sands, St. Louis County; Don L. Young, Jr., Hazelwood, both of Mo.

[73] Assignee: McDonnell Douglas Corporation, St. Louis, Mo.

[22] Filed: Dec. 27, 1971

[21] Appl. No.: 212,313

[52] U.S. Cl. .............................................. 244/83 R
[51] Int. Cl. .............................................. B64c 13/2
[58] Field of Search .................. 244/75, 76 R, 76 A, 244/76 B, 76 C, 77, 78, 80, 81, 82, 83 R, 85, 89, 90

[56] References Cited
UNITED STATES PATENTS

| | | | |
|---|---|---|---|
| 2,652,994 | 9/1953 | Feeney | 244/83 R |
| 2,674,900 | 4/1954 | Unterman | 244/83 R |
| 2,796,774 | 6/1957 | Peed, Jr. | 244/83 R |
| 2,940,697 | 6/1960 | Lawrence | 244/83 R |
| 2,974,908 | 3/1961 | Platt | 244/83 R |
| 2,680,581 | 6/1954 | McKellar | 244/83 R |
| 2,667,315 | 1/1954 | Watson et al. | 244/83 R |

Primary Examiner—Milton Buchler
Assistant Examiner—Jesus D. Sotelo
Attorney—Frederick M. Woodruff et al.

[57] ABSTRACT

A control system for vehicles capable of travel at high speeds on land, and in the air or water, in which the operator of such a vehicle is provided with means to regulate his capabilities to the loads imposed on the vehicle control surface subjected to a wide range of loads. The system involves a parallel related arrangement of a spring damper device, and a trim actuator and feel spring, with a ratio changer device in series that operates to provide the operator with a substantially constant control load for "G" forces acting on the vehicle control surface for the full range of surface deflection and throughout the vehicle operating range. The system includes a mass which is sensitive to the acceleration of the vehicle and to the normal translation of the vehicle. This gives the operator a way of matching his capabilities to the loads imposed throughout the operating range of the vehicle.

6 Claims, 7 Drawing Figures

VEHICLE CONTROL SYSTEM

BACKGROUND OF THE INVENTION

This invention is aimed at improving the control system for high performance vehicles. The main object is to provide an improved mechanical method to tailor the control forces to the required movement of a control surface in order to compensate for the widely varying load characteristics imposed during the usual or unusual maneuvering of such a vehicle.

The invention has utility in connection with vehicles capable of high speed travel in water, on land and in the air, and in order to set forth an exemplary embodiment the following disclosure will relate to aircraft.

Modern high performance fighter aircraft are required to perform their missions throughout large ranges of speed and altitude. Tailoring a control system to this large flight envelope has created many problems because of the inherent variations in the aircraft's longitudinal static and dynamic stability characteristics. For example, nose up pitching tendencies may occur during maneuvering and is exhibited by a reduction in the stick force gradient as normal load factor is increased, and even though a satisfactory positive stick force gradient may exist at low load factors, the gradient will reduce to zero or less at high load factors. The pitch transients encountered during high "G" deceleration through the transonic speed range may also exceed an acceptable level. Pilot induced oscillations are easily initiated if the pitch stability augmentation system fails, in a flight regime below 10,000 feet and above Mach 0.8, particularly at aft C.G. positions. Some tactical aircraft have problems with stick free short period damping as well as stick centering. High friction forces in the longitudinal control system "also mask the feel normally sensed by the pilot."

The present longitudinal control and pilot feel system embodies an organization of components which will greatly improve stick free damping through the use of reduced sensitivity, reduced normal load factor feel, increased pitch acceleration feel and increased stick centering characteristics. The reduced sensitivity is obtained through an increase in stick deflection required to perform maneuvers, and reduced friction is obtained by eliminating a number of the presently employed components and by a simplification of the control system.

A principal object of the present invention is to provide an improved control system for vehicles using controls subject to large loads due to high speed travel. The control system consists of a motion damper for the operator's or pilot's control, a gravity sensitive mass, and a variable ratio changing mechanism for obtaining essentially constant operator control movement or deflection per "G." It is also an object of the invention to greatly simplify the control system components thereby reducing the accumulation of friction in the over-all system.

The incorporation of a gravity responsive mass has been found to significantly reduce the operators control or stick force per "G" variation with varying control load characteristics. The increased acceleration response improves the short period damping while degrading the control system damping, and using a damper in the system eliminates the control system oscillation to a significant degree.

It has been found that a variable ratio change mechanism permits one to obtain a relative constant control or stick travel per $N_z$. With a relative constant control or stick movement per $N_z$ there is relatively no problem in obtaining a constant $F_S$ per $N_z$.

Other advantages of the improved system will be set forth in greater detail in the following disclosure of a presently preferred control system.

BRIEF DESCRIPTION OF THE DRAWINGS

The invention in a preferred embodiment has been disclosed in the accompanying drawings, wherein.

DETAILED DESCRIPTION OF THE CONTROL AND FEEL SYSTEM

Figure 1:
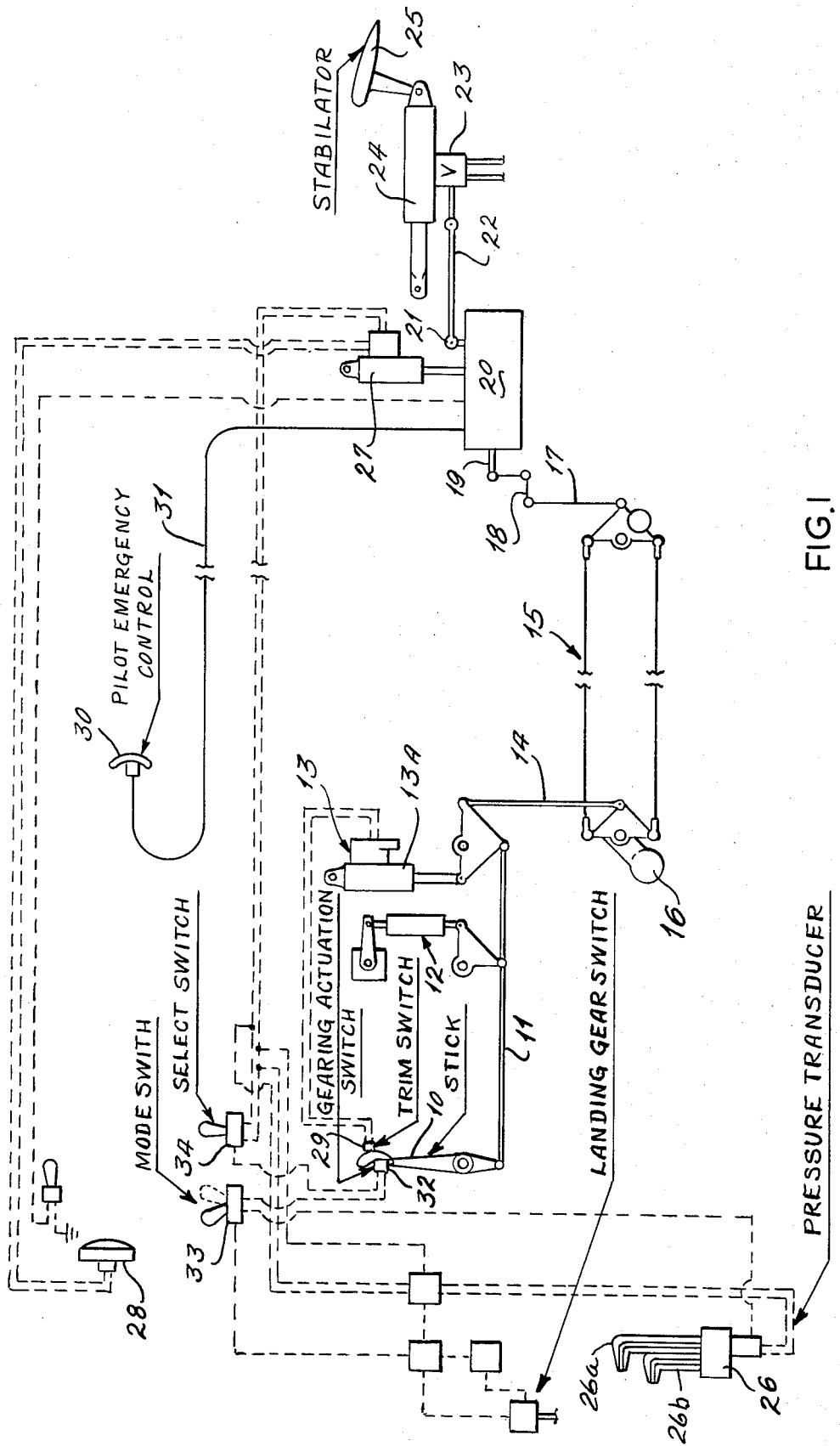
FIG. 1 is a schematic view of the longitudinal control and pilot feel system in which the characteristics and operating effects of the invention are best understood.

In FIG. 1 there is shown a schematic view of the longitudinal control and pilot feel system in which the pilot's control stick 10 is pivoted for fore and aft movement to impose the pilots control selection on a push-pull link 11 which extends through a safety spring damper system 12 and a trim actuator and feel spring system 13 to a link 14 associated with the flight control cable system 15. The cable system 15 includes a bobweight 16 or any other acceleration sensing means responsive to vertical forces on the aircraft. The cable system 15 transfers its movement to a link 17 which is connected by a bell crank 18 to the input 19 of a ratio changer mechanism generally indicated at 20. The mechanism 20 has an output 21 for operating a link 22 associated with the control valve 23 of the actuator 24 operatively connected to the stabilator surface 25.

In the system of FIG. 1 there is a pressure transducer 26 in which the measurement of static and dynamic conditions is made and translated through suitable electrical wiring means to an actuator 27 which introduces a change in the effectiveness of the mechanism 20 to maintain the stick to stabilator gearing ratio. The movement of the actuator 27 when translated into stick to stabilator gearing ratio is displayed at the visual monitor unit 28. Also the pilot's stick 10 is provided with a trim switch 29 which imposes through the actuator 13A of the system 13 a desired adjustment in the position of the feel spring cartridge 13A to trim the aircraft. The system of FIG. 1 also discloses a pilot emergencey control 30 which is connected by a suitable cable 31 to the ratio changer mechanism seen at 20. The emergency control permits a mechanical reversion to a gearing ratio suitable for return to base and landing should a failure in the system occur.

The pilot has at his control stick a switch 32 which is incorporated in a suitable circuit with a flight mode switch 33 in circuit with the pressure transducer 26. The switch 33 is associated with a selector switch 34 for either manual or automatic control of the ratio changer actuator 27.

The mode switch 33 has been shown in the automatic position which operatively connects the pressure transducer 26 with the ratio changer 20 such that the ratio changer actuator 27 is monitored in response to the dynamic and static pressure sensed by the respective pitot tubes 26a and 26b. When the mode switch 33 is moved to the right (dotted outline) the pressure transducer is cut out and the system becomes manually operable through the pilot switch 32. Switch 32 is operated in conjunction with the select switch 34 which is shown in the off position. When switch 34 is moved to the left the pilot's operation of stick switch 32 will effect energization of the ratio changer actuator 27 to increase the stick to stabilator deflection ratio. When the mode switch 34 is positioned to the right of the off position, the ratio changer actuator 27 is conditioned to operate through stick switch 32 to decrease the stick to stabilator deflection ratio. In this manner the system of FIG. 1 will permit the pilot to fly with the feel system automatically monitored in terms of dynamic and static pressure for any speed and altitude with substantially the same stick feel, or to select his own ratio.

In the system of FIG. 1, the pilot emergency control 30 operates on the ratio changer unit 20 to provide a way to neutralize the operation of unit 20, should the unit 20 malfunction, and return the control over the stabilator 25 to a one-to-one ratio in terms of control stick deflection. The control 30 is most useful to operate on unit 20 during landing when the pilot needs great authority over the movement of the stabilator at low speed with minimum of stick movement, thereby making stabilator movement sensitive to stick movement.

Figure 2:
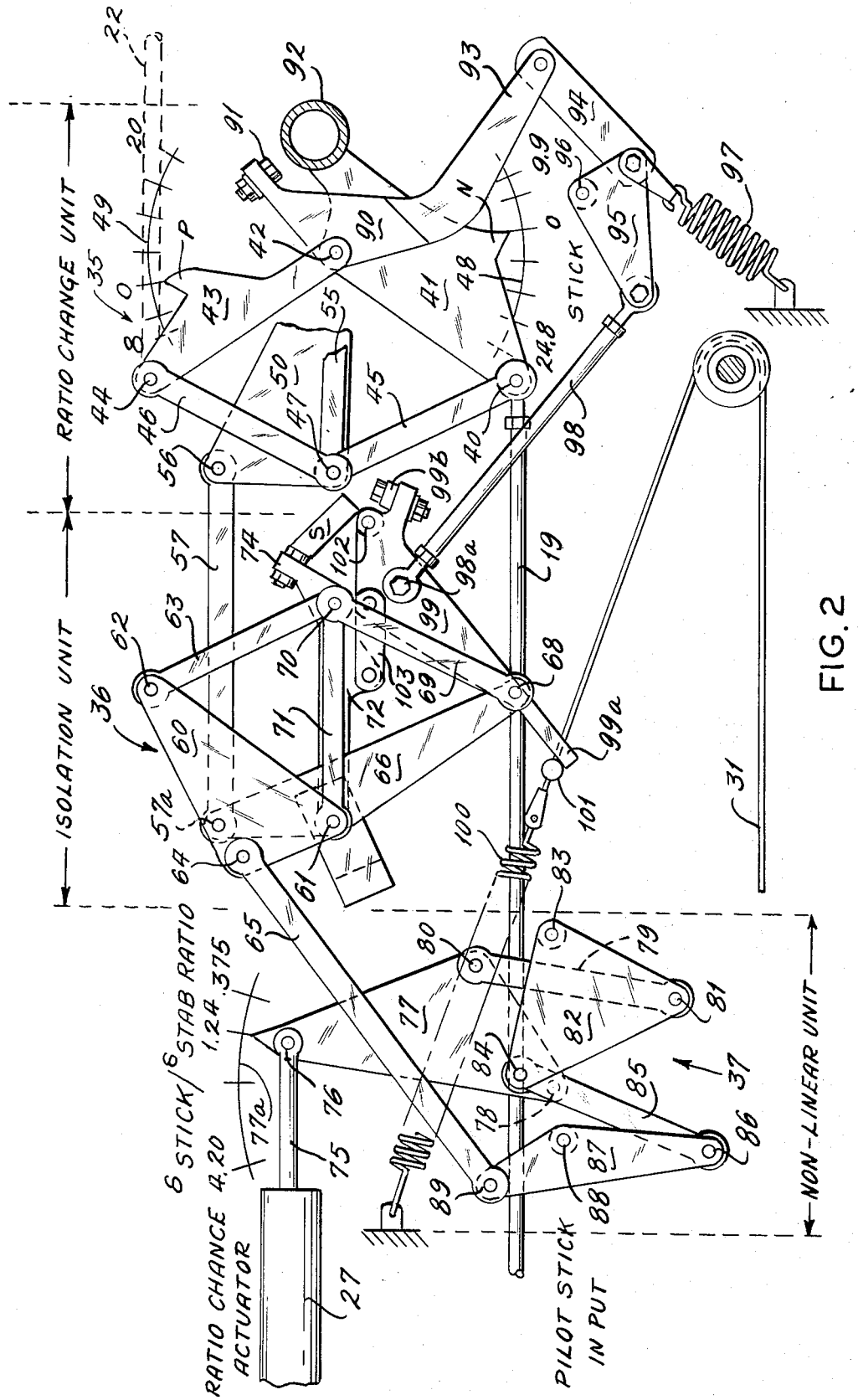
FIG. 2 is a schematic view of a linkage system incorporated in the ratio changer assembly of FIG. 1, the view being shown in a setting where the ratio is one-to-one.

Turning now to FIG. 2, the ratio changer mechanism 20 includes a number of sub-assembly units which comprise the ratio changer unit 35 to which the input link 19 from the stick 10 is connected and from which the output link 22 leads off to the stabilator. The ratio of the unit 35 is operatively adjusted by an isolation unit 36 which, in turn, is rendered inoperative to adjust unit 35 by the pilot emergency control 30. The isolation unit 36 is monitored by a non-linear unit 37 associated with the actuator 27 which imposes on the overall mechanism 20 the desired stick to stabilator deflection ratio.

Referring to FIG. 2 it can be seen that the ratio changer mechanism 20 in the control feel system seen in FIG. 1 includes the several mechanical units heretofore mentioned, but which now will be described in the manner of its operation. First is the ratio change unit 35 directly actuated by the push-pull link 19 pivotally connected at 40 and extending to the bellcrank 18 of FIG. 1. The link 19 connects with a link 41 movable about a fixed pivot 42. A stabilator actuator link 43 is mounted on the same pivot 42 as for the stick follower link 41 and has a connection 44 with the push-pull link 22 running to the power actuator 24 for the stabilator 25. The stick link 41 and the stabilator link 43 are connected by respective links 45 and 46, the adjacent ends of which are joined at a movable pivot 47. It is evident that if the links 41, 43, 45 and 46 remain in the same configuration as shown in FIG. 2 the amount of motion input from the push-pull rod 19 will be transmitted without change to the output going to the link 22 running to the stabilator 25. Thus, a one-to-one ratio is achieved and is confirmed on the stick scale 48 and stabilator scale 49, as the respective pointers N and P will move the same number of units on the respective scales. The one-to-one ratio is maintained by the link 50 movable about a fixed pivot 51 (FIG. 3) and having one end 52 connected at 53 to one end 54 of a ratio changer link 55, the opposite end of the changer link 55 is joined with the remote ends of links 45 and 46 at pivot 47 (FIG. 2).

The common pivot connection 47 for links 45 and 46 and changer link 55 is independent of the fixed pivot 51 (FIG. 3) for the link 50, and in the position of FIG. 2, the pivot 47 is directly aligned with pivot 51. When the end 54 (FIG. 3) of the changer link 55 is directly over the pivot 42 for links 41 and 43, the latter links move in one-to-one ratio. However, the movement of the ratio changer link 55 as its end 54 is moved down from the pivot 42 to overlie link 41 (FIG. 5) will more or less decrease the gain of the stick movement over the stabilator movement. In other words, the decrease in gain means that the stabilator travel is increased or is more than the stick travel. For one unit of movement of pointer N on scale 48, the pointer P will move more than one unit on scale 49. For increased gain, or greater stick travel than stabilator travel the end 54 of the changer link 55 must move up from pivot 42 or over the link 43, as in FIG. 3. Thus, the position of the end 54 of ratio changer link 55 relative to pivot 42 determines the ratio of movement of pilot stick to stabilator. The position of link 55 is determined or modified by having the third point of link 50 connected by pivot 56 to the end of a push-pull link 57 which is under the control of the isolation unit 36 next to be described.

In FIG. 2, and other views that may be referred to, the isolation unit 36 can be seen to include a link 60 movable about a fixed pivot 61, and providing a movable pivot 62 for a link 63. The link 60 also provides a pivot connection 64 for a motion input link 65 which drives link 60. A swing link 66 pivoted on and in axial alignment at 67 with the pivot 61 has a pivot connection at 68 on its longer arm for a link 69, and links 63 and 69 have adjacent ends connected by a movable pivot means 70. Comparing FIGS. 2, 3, and 4 it is seen that a third link 71 has one end connected at pivot 70 for links 63 and 69 and its opposite end connected at the pivot 67 to another swing link 72 which is mounted at a fixed pivot 73 (FIG. 3) in alignment with pivot 70 when viewed as in FIG. 2. The swing link 72 has one end 74 normally in abutment with stop S and its opposite end is connected to link 71 by pivot 67 located in alignment with pivot 61, but movable out of such alignment upon operation of the emergency control 30 through cable 31.

The motion input link 65 is part of a non-linear unit 37 which responds to the setting of the ratio changer actuator 27 and drives the isolation unit 36. In FIG. 2 the actuator 27 has its piston rod 75 connected by pivot 76 to a link 77 and the link 77 has a pointer to traverse a scale 77a for visually indicating the stick to stabilator deflection ratio. The scale 77a can conveniently be located near the pilot in a display device shown at 28 (FIG. 1). The link 77 is movable about a fixed pivot point 78 (FIG. 3) and serves to move a link 79 connected to it at one end by pivot means 80. The opposite end of link 79 is connected by pivot means 81 to a link 82. The link 82 has a fixed pivot means 83 and a movable pivot means 84 for connection to a link 85. The link 85 is connected by pivot means 86 to a swing link 87 movable about a fixed pivot means 88 for transferring motion of the unit 37 to the end of link 65 connected by pivot means 89 at link 87.

In FIG. 2 the described mechanism may have an initial setting with the ratio of stick to stabilator motion located at 1.24 on scale 77a and the ratio changer unit set at zero on both the stick scale 48 and stabilator scale 49. At this setting the motion of the stick by the pilot is transferred by push-pull rod 19 to move link 41. The link 43 moves at the same rate or zero gain with link 41 due to the set up of the links 50 and 55 with their common pivot 53 coincident with the pivot 42 for links 41 and 43. Thus, the stabilator push-pull rod 22 is moved at the same rate.

When the pilot wishes to select a gain of stick movement over stabilator movement, the ratio changer actuator 27 is energized to move the link 77 so its pointer moves over scale 77a toward the left in FIG. 2 to increase the gain. As this motion of link 77 takes place, link 79 moves link 82 clockwise about pivot 83 which pulls link 85 upwardly and swings link 87 in a counterclockwise sense about fixed pivot 88. The motion of link 87 pulls link 85 to the left to change the setting of the isolation unit 36.

The setting of the isolation unit 36 (FIGS. 2 and 3) is altered by link 60 being swung counterclockwise about the fixed pivot 61 so that the common pivot 70 for links 63, 69 and 71 is moved up and out of axial alignment with the pivot 73 for link 72. This conjoint motion of links 63, 69 and 71 swings link 66 in a counterclockwise direction so link 66 pulls link 57 from pivot 57a in a leftwardly direction. The link 57 likewise pulls link 50 in the leftward direction to raise the common pivot 53 at ends 52 and 54 for links 50 and 55 out of coincidence with the pivot 42 for links 41 and 43. Now the ratio change unit 35 has a longer moment arm for the stick than for the stabilator and the desired gain for the pilot has been obtained. The motion of the several links in the units 35, 36 and 37, when selecting a gain is shown in FIG. 4 where stick motion toward the gain scale reading of 24.8 on scale 48 is greater than the motion on scale 49 for the stabilator.

Figure 3:
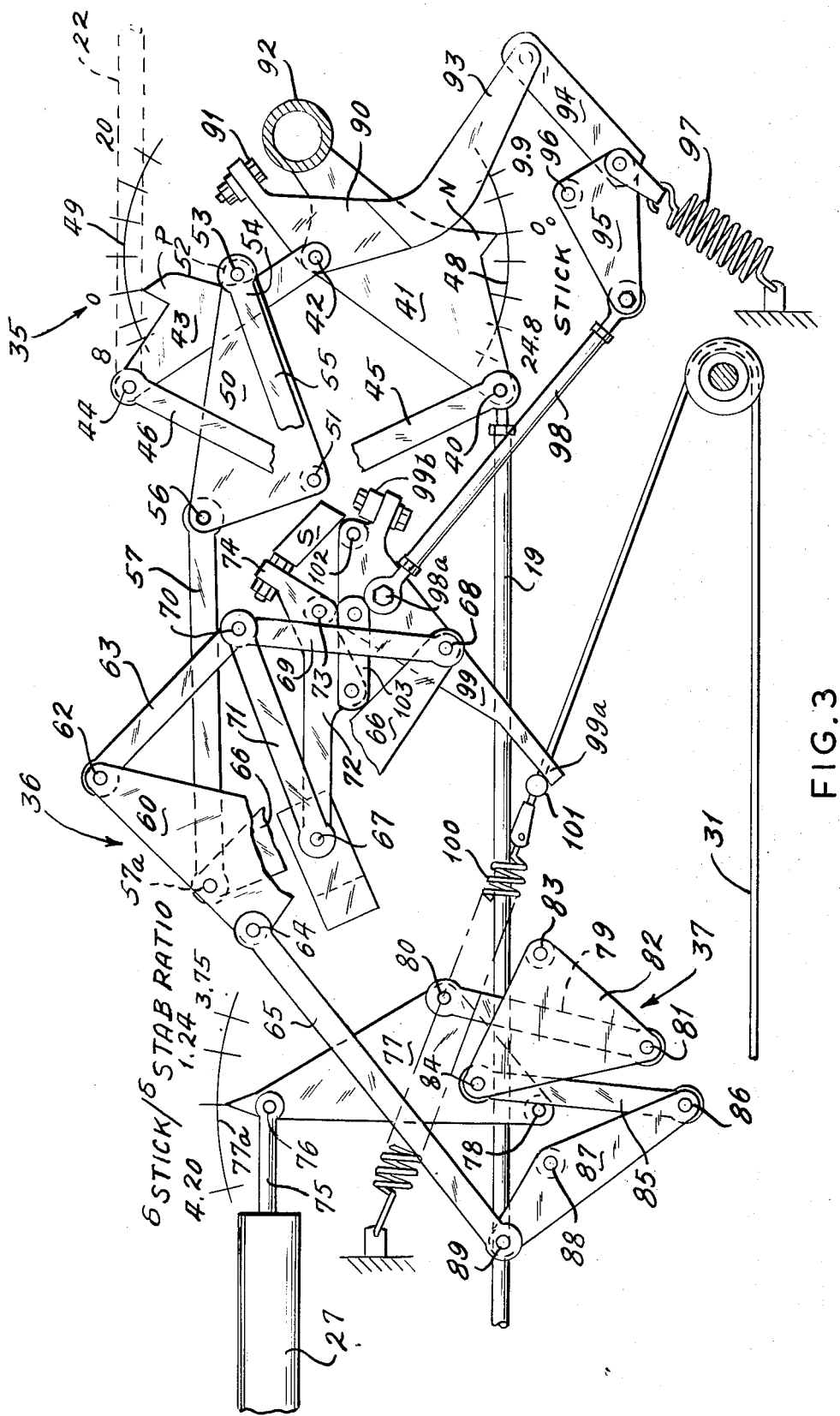
FIGS. 3 to 6, inclusive, are schematic views of the ratio changer assembly of FIG. 2, but moved to various settings to illustrate the manner in which the components affect the pilot stick forces for various flight conditions and settings of the stabilator control surface.
Figure 4:
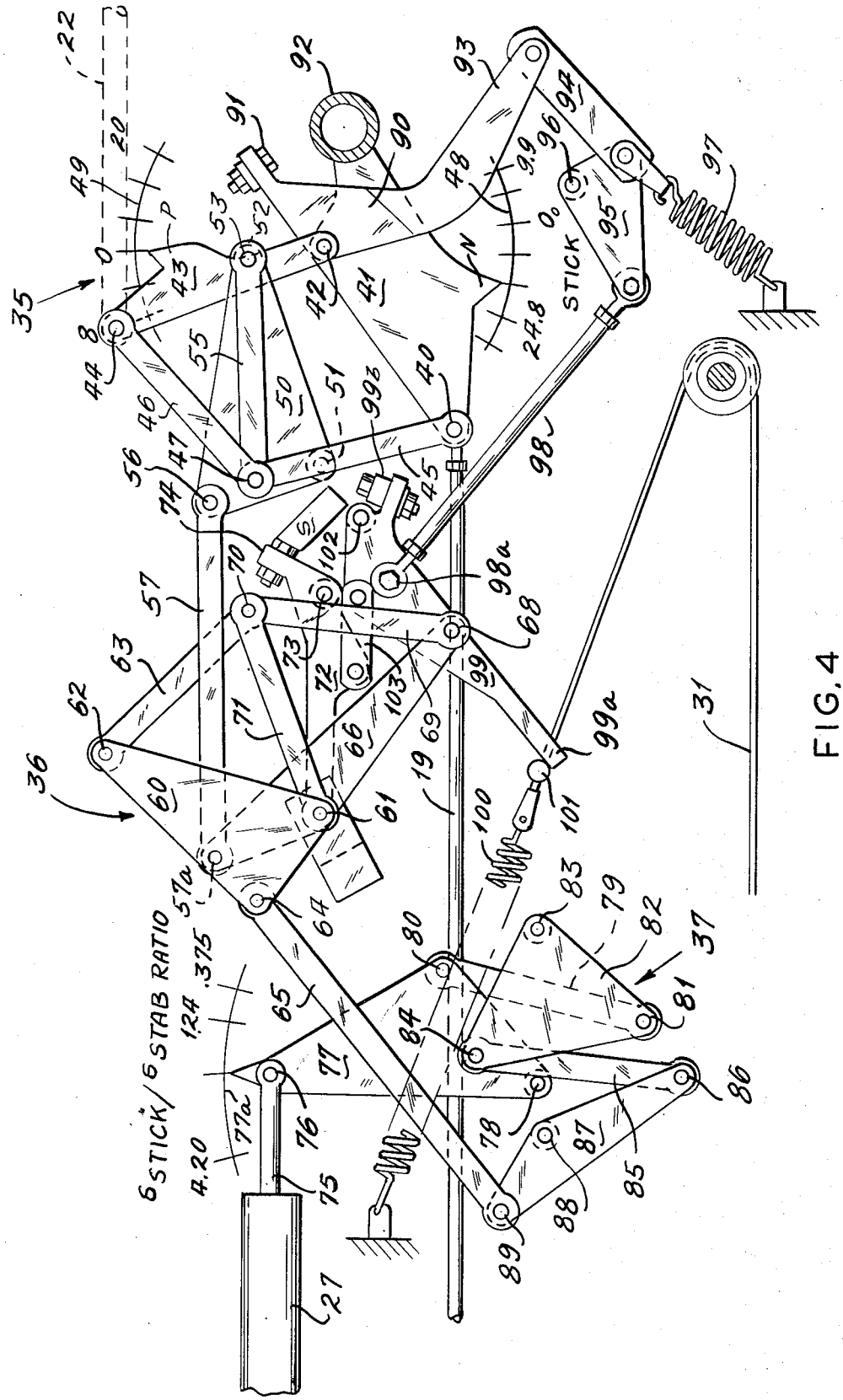
Figure 5:
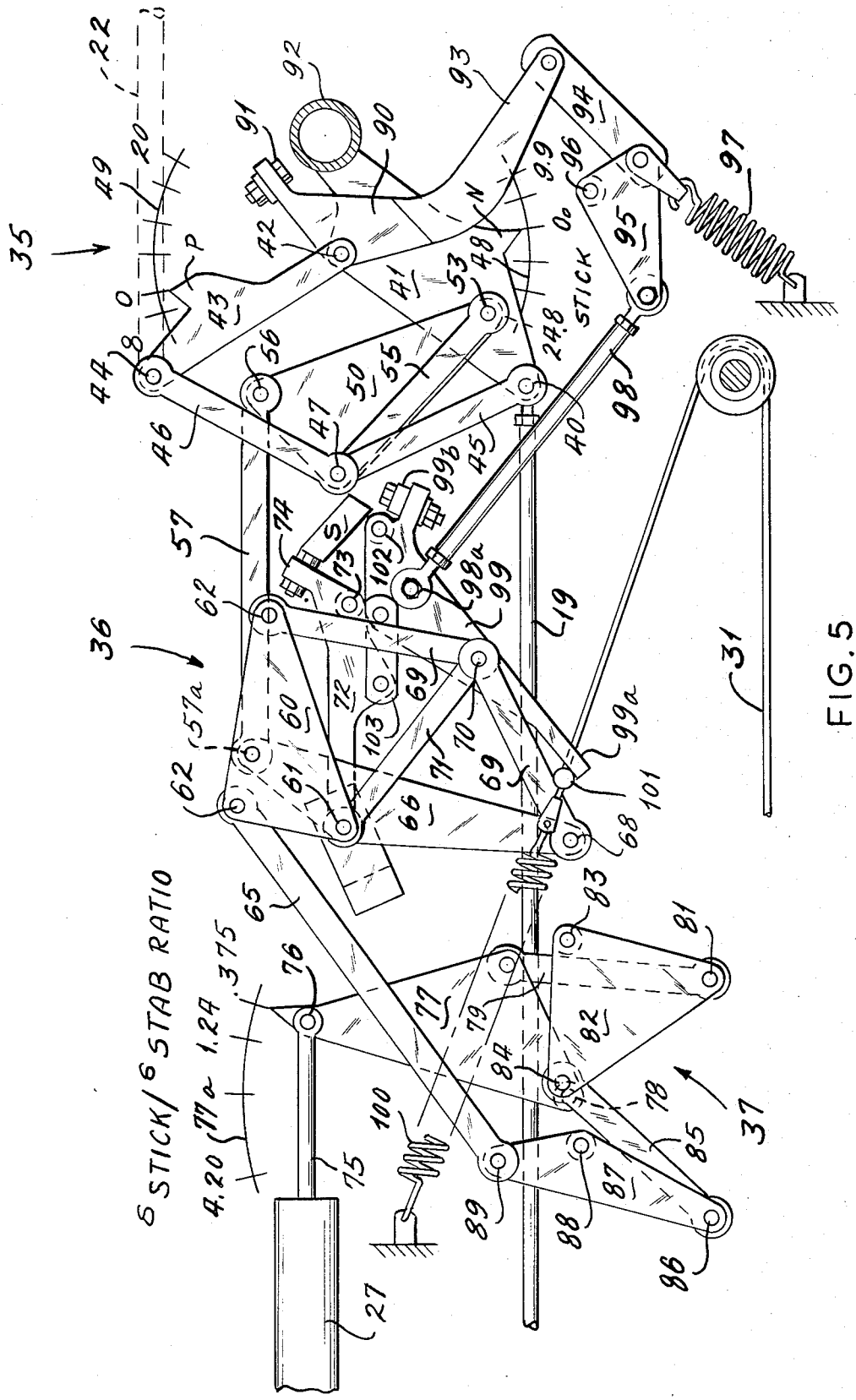
Figure 6:
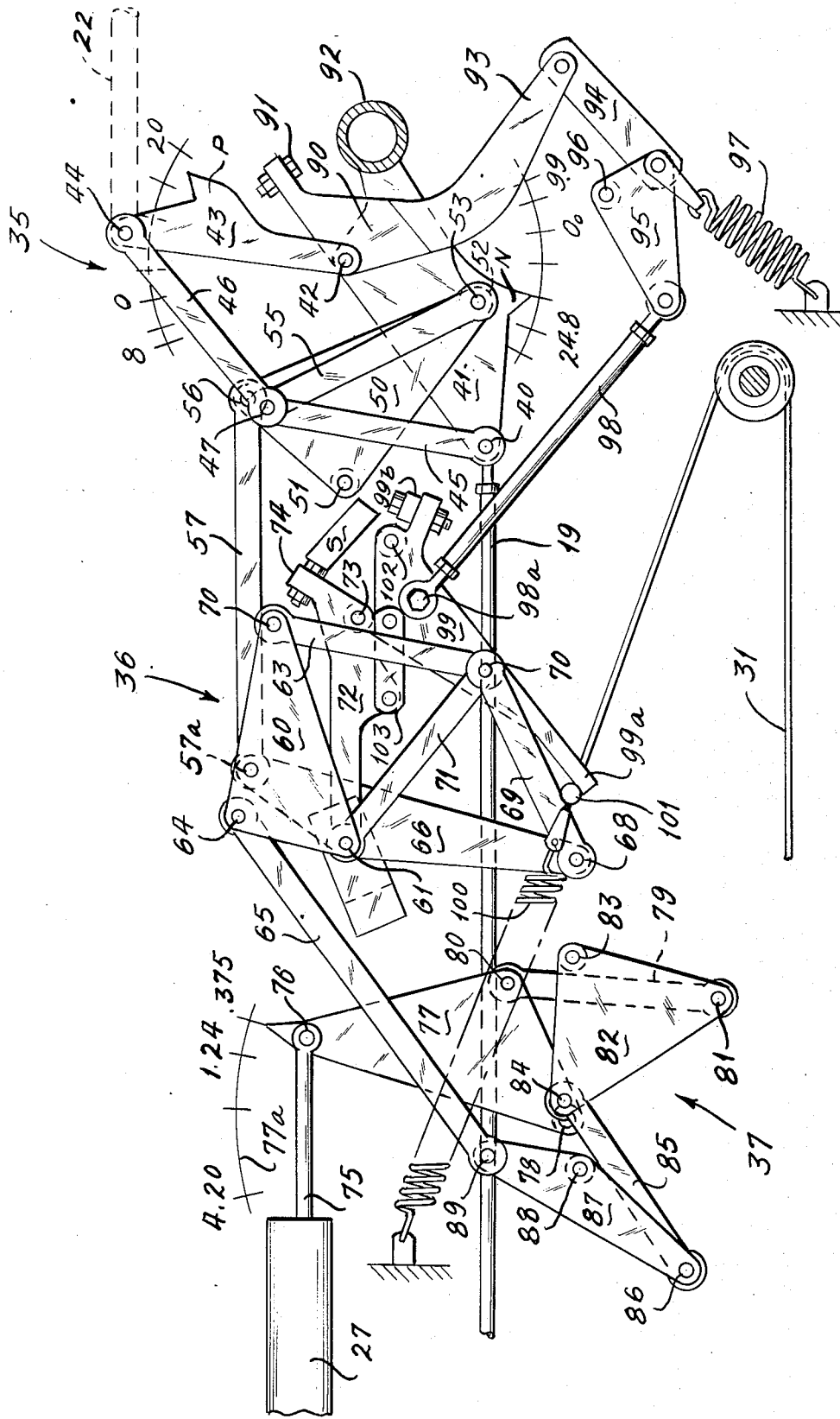

FIGS. 5 and 6 illustrate the operation of the mechanism for decreased gain where stick motion is less than stabilator motion, and the same reference characters refer to the same parts that have been so designated in FIGS. 2, 3, and 4. The mechanism is now set (FIG. 5) with the ratio changer actuator 27 operated to move the pointer on link 77 to .375 on scale 77a. The result is that link 65 readjusts the isolation unit 36 to move the common pivot 70 for links 63, 69 and 71 down from pivot 73. In so doing, link 57 is pushed rightwardly to move link 50 in a counterclockwise direction to lower the common pivot at link ends 52 and 54 below pivot 42 for links 41 and 43. This action of link 50 shortens the moment arm of link 41 and lengthens the moment arm of link 43. Thus, in FIG. 5 the ratio change actuator has moved to the ratio of 0.375 which conditions the several units for producing a decrease in the pilot's stick travel for stabilator travel. The travel of pointers N and P in the scales 48 and 49 can be noted in comparing FIGS. 5 and 6.

Figure 7:
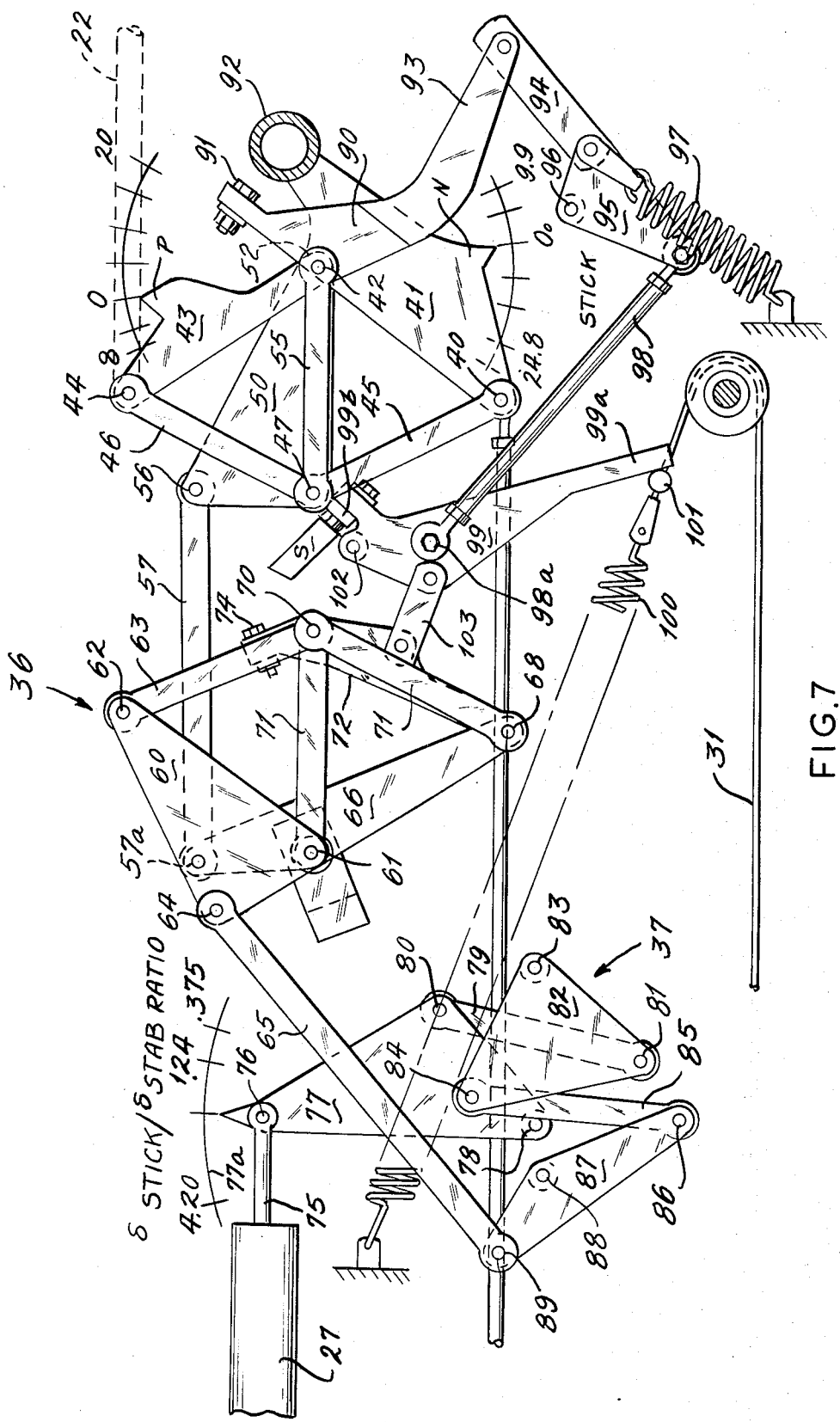
FIG. 7 is a view similar to FIG. 3, but showing the ratio changer activated upon operation of the emergency control for restoring a one-to-one ratio of stick to stabilator deflection.

Included in the ratio changer mechanism of FIGS. 2 to 6 is a pilot emergency control system which will be described in the view of FIG. 7. Previous reference has been made to this control in FIG. 1. The common pivot 42 for links 41 and 43 also supports a link 90 having an adjustable tappet 91 located in the path of movement of the element 92 on link 41. The arm 93 of link 90 is connected by a link 94 to a link 95 movable about a fixed pivot 96. The link 95 is urged in a clockwise direction by a spring 97, and the spring normally holds the link in the position shown in any of FIGS. 2 through 6 so that the tappet 91 acts as a stop to prevent the element 92 from moving so the link 41 can be swung toward the position indicated at 9.9 on scale 48 for the maximum nose down position of stabilator 25.

The emergency control system includes the pilot grip 30 which is attached to a cable 31 (FIG. 2) which is tensioned by spring 100 so that an element 101 on the cable 31 will normally be located to allow the spring 97 to hold the tappet 91 against the maximum range of movement. In so doing the link 95 acts on push-pull link 98 to locate the trip link 99 with its trip end 99a against the cable element 101 and its opposite end tappet 99b spaced from stop S. The trip link 99 is movable about a fixed pivot 102 and is connected by an articulation link 103 to the link 72 of the isolation unit 36 so that when the link 99 is pulled by the cable element 101 to the right as viewed in FIG. 7 it will swing link 99 so its tappet 99b will move against the stop S. This action of link 99 on link 72 will adjust the isolation unit 36 to shift the common pivot (FIG. 3) 67 for links 71 and 72 in a counterclockwise direction about the fixed pivot 73. This action causes link 98 to shift link 95 against the pull of spring 97 to shift the tappet 91 on link 90 counterclockwise, thereby allowing element 92 a longer arc of travel. Thus, the tappet 91 is moved away from element 92 to allow the stick 10 to travel for a full nose down setting of the stabilator 25. When the pilot releases the trip lever end 99a the spring 97 will automatically reset the emergency system to locate the tappet 91 as shown in FIG. 2, and spring 100 will automatically withdraw the element 101 on the emergency cable 31.

SUMMARY OF RATIO CHANGE MECHANISM OPERATION

In the foregoing description it has been pointed, out in connection with the settings of the various units shown in FIG. 2, that there is a setting at which the stick motion input through push-pull link 19 is equal to the motion output through link 22 to the stabilator 25. In other words, the motion of the pilot stick 10 to the motion of the stabilator 25 is translated at a one-to-one ratio. In order to achieve this ratio the ratio changer actuator 27 must necessarily be operated so that the link 77 is located on the display scale 77a at a value of the stick to stabilator ratio equal to 1.24. The setting thus obtained conditions the isolation unit 36 so that the common pivot 70 for the links 63, 69 and 71 (FIG. 2) is coincident with the pivot 73 for the link 72. The result of the positioning of the unit 36 causes the swing link 66 to assume a position where the motion transmitting link 57 locates the link 50 in the ratio changer unit 35 such that the pivot 53 between the adjacent ends 52 and 54 of links 50 and 55 respectively is coincident with the common pivot 42 for the links 41 and 43.

Thus, the links 41 and 43 move in a one-to-one ratio whenever the push-pull link 19 is displaced.

When the ratio of stick to stabilator motion is to be decreased, the ratio changer actuator 27 must be operated to displace the link 77 to the right of the position shown in FIG. 2 or to the position of FIG. 5. The result of this operation of the actuator 27 is to reset the isolation unit 26 so that the common pivot 70 for the respective links 63, 69 and 71 is displaced below the pivot 73 for the link 72. As the common pivot 70 moves down to the position shown in FIG. 5 the swing link 66 is displaced in a clockwise direction about the pivot 61, thereby displacing the link 57 rightwardly and resetting the various links in the ratio changer unit 35 so that the common pivot 53 for the ends 52 and 54 of the links 50 and 55 respectively moves in a clockwise direction and relocates below the pivot 42 for the links 41 and 43. This setting causes the stabilator to move a greater distance than the displacement of the pilot stick 10.

If, on the other hand, it is desired to increase the stick travel relative to the stabilator travel, the ratio changer actuator 27 must be displaced to the left of the ratio 1.24. As a consequence of this setting the isolation unit 36 assumes a position where the common pivot 70 is now displaced upwardly relative to the fixed pivot 73, with the result that the swing link 66 is moved in a counterclockwise direction to pull on the link 57 and cause the link 50 in the ratio change unit 35 to move also in a counterclockwise direction so that the common pivot 53 for the links 50 and 55 is displaced upwardly relative to the pivot 42 for the links 41 and 43.

The action of the pilot reset control 30 through the cable 31 is to displace the link 99 against the loading of the spring 97 to restore the alignment of the pivot 53 with the pivot 42 in the ratio change unit. It makes no difference where the setting is for the ratio change actuator when the pilot emergency control 30 is operated to displace link 98 into the position shown in FIG. 7.

The system of FIG. 1 provides for the pilot of a high performance aircraft the ability to adjust the load on the stick 10 so that it will be within managable limits, while maintaining an accurate "feel" of the control surface 25 for the flight regime of any moment in time. For example, with the aircraft in steady flight at a given altitude and speed, the pilot has the choice of flying manually without the aid of transducer 26, but with the combination of the stick mounted switch 29 for trim, and switch 32 and ratio changer selection switch 34 for increasing or decreasing the stick to stabilator deflection ratio. With such a flight condition, the system of FIG. 1 will allow the pilot to select a ratio and obtain trim where the stick 10 will require little or no pilot manipulation. As another example, the pilot may be in an aerobatic flight regime where his attention is divided to the extent that automatic operation of the ratio change unit is necessary. At such time the switch 33 is set as shown so that the transducer 26 will apply the dynamic and static pressure to the mechanism 20 for the purpose of monitoring the stick to stabilator deflection ratio. The monitoring effect is displayed at the unit 28 within the view of the pilot, but the work is being done by the actuator 27 which is responsive to the changing dynamic and static pressure conditions, whether rapid or gradual.

While the foregoing disclosure has related the central system to an aircraft stabilator surface, it is to be understood that such a surface, when applied to a water or ground vehicle, will normally be used for directional control. Therefore, the broad term control surface will apply to any of the several types of vehicles mentioned herein. In a ground vehicle the aircraft type stabilator can be termed more aptly a control surface for horizontal steering. In a water vehicle, the control surface assumes the function of a rudder or lifting foil (or foils) which reacts to water much like the stabilator reacts to air.

What is claimed is:

1. In an aircraft control system having an operator's control means and a control surface; the improved combination of means operatively interconnecting the operator's control with the control surface, including spring damper means connected into said operative means, trim actuator feel spring means connected into said operative means in parallel relation with said spring damper means, ratio changer means disposed in said operative means in series with said spring damper means, pressure transducer means responsive to dynamic and static pressure conditions of the aircraft when in flight, said transducer means have operative connection with said ratio changer means to impose on said ratio changer means a ratio of control means deflection to control surface deflection commensurate with the speed and altitude of the aircraft and within the operator's ability to fly the aircraft, and means under the control of the operator and connected to said transducer means to selectively cut-in and cut-out said pressure transducer operative connection with said ratio changer means.

2. The improvement set forth in claim 1 and including operator emergency control means connected to said ratio changer means to over-ride the latter means and select a one-to-one ratio between said operator's control means and control surface deflection.

3. In aircraft flight control apparatus the improved combination with a movable control surface and a pilot's control stick of means operably interconnecting said stick and control surface to permit the pilot to fly the aircraft in any flight condition with substantially the same stick feel and aircraft response commensurate with the speed and altitude of the aircraft, said improved combination consisting of trim actuator means and motion damper means operably connected into said operable interconnecting means, acceleration sensing means in said operable interconnecting means, ratio changer means in said operable interconnecting means between said acceleration sensing means and said control surface to vary the stick to control surface deflection ratio, ratio changing actuator means connected into said ratio changer means, and static and dynamic pressure transducer means operably connected to said actuator means to monitor the operation of said actuator means in response to the static and dynamic conditions of the aircraft flight regime, said ratio changer means having a non-linear unit connected to said actuator means, and an isolation unit connected between said non-linear unit and said ratio changer operable to control the ratio of stick to control surface deflection.

4. The improved combination set forth in claim 3 and including pilot operated means to disable the connection between said pressure transducer means and said actuator means, whereby to permit the pilot to manually monitor the operation of said actuator means.

5. The improved combination set forth in claim 3 and including a pilot actuated emergency control connected into said ratio changer means to adjust said isolation unit whereby said ratio changer means sets the movement of said stick and control surface deflection in a one-to-one ratio.

6. The improved combination set forth in claim 3 and including pilot actuated means connected to said trim actuator means to permit the pilot to trim the aircraft.

* * * * *

UNITED STATES PATENT OFFICE
CERTIFICATE OF CORRECTION

Patent No. 3,773,282             Dated November 20, 1973

Inventor(s) Ronald L. Sands and Don L. Young, Jr.

It is certified that error appears in the above-identified patent and that said Letters Patent are hereby corrected as shown below:

In Column 5, line 27, the numeral "85" should be deleted and the numeral "65" should be substituted therefor.

Signed and sealed this 16th day of April 1974.

(SEAL)
Attest:

EDWARD M. FLETCHER, JR.
Attesting Officer

C. MARSHALL DANN
Commissioner of Patents